US006865270B1

(12) United States Patent
Troxel

(10) Patent No.: US 6,865,270 B1
(45) Date of Patent: Mar. 8, 2005

(54) ECHO CANCELLATION METHOD AND APPARATUS

(75) Inventor: Dana L. Troxel, Marysville, WA (US)

(73) Assignee: Rane Corporation, Mukilteo, WA (US)

( * ) Notice: Subject to any disclaimer, the term of this patent is extended or adjusted under 35 U.S.C. 154(b) by 899 days.

(21) Appl. No.: 09/668,030

(22) Filed: Sep. 21, 2000

(51) Int. Cl.$^7$ ................................................ H04M 1/00
(52) U.S. Cl. ............................. 379/406.02; 379/406.06; 708/322
(58) Field of Search ....................... 379/406.01, 406.02, 379/406.04, 406.06, 406.08, 406.11; 708/300, 322

(56) References Cited

U.S. PATENT DOCUMENTS

| | | | |
|---|---|---|---|
| 5,206,854 A | | 4/1993 | Betts et al. |
| 5,295,136 A | | 3/1994 | Ashley et al. |
| 5,535,194 A | | 7/1996 | Ashley et al. |
| 5,664,011 A | | 9/1997 | Crochiere et al. |
| 6,181,794 B1 | * | 1/2001 | Park et al. ............. 379/406.08 |
| 6,442,273 B1 | * | 8/2002 | Okuda ................... 379/406.03 |

OTHER PUBLICATIONS

Kazuo Ochiai, Takashi Araseki and Takashi Ogihara, "Echo Canceler with Two Echo Path Models" *IEEE Transactions on Communications*, vol. Com–25, No. 6, Jun. 1977.

Hua Ye and Bo–Xiu Wu, "A New Double–Talk Detection Algorithm Based on the Orthogonality Theorem", *IEEE Transactions on Communications*, vol. 39, No. 11, Nov. 1991.

Simon Haykin, *Adaptive Filter Theory*, 3rd Ed., 1996, pp. 432–439; 746–747, Prentice Hall.

\* cited by examiner

*Primary Examiner*—Xu Mei
*Assistant Examiner*—Jefferey Harold
(74) *Attorney, Agent, or Firm*—Seed IP Law Group PLLC

(57) ABSTRACT

An echo cancellation invention which does away with the need for an accurate double-talk detector, while maintaining a higher adaptation gain for quicker convergence and also providing increased stability. It does this by operating two filter models of the acoustic path in parallel. One model is adapted continuously to find the most accurate model of the echo path, while the other is not. The echo canceller output is taken from the filter that is not adapted. A comparison of the residual error (echo) is done between the model being adapted and the model being listened to at regular intervals. When the model being adapted has less error (echo) than the model being listened to its filter coefficients are copied to the other model. If the model being adapted has greater error (echo) than the other model (caused by noise diverging the adaptation process) then the adapted model has its coefficients overwritten by the filter that is listened to. This process keeps error from accumulating in the adapted filter by removing divergence at regular intervals (improving overall convergence). Since the output is taken from the filter that is not adapted, higher adaptation gains may be used without fear of the user hearing any effects of adapting with a higher gain in the presence of noise.

20 Claims, 7 Drawing Sheets

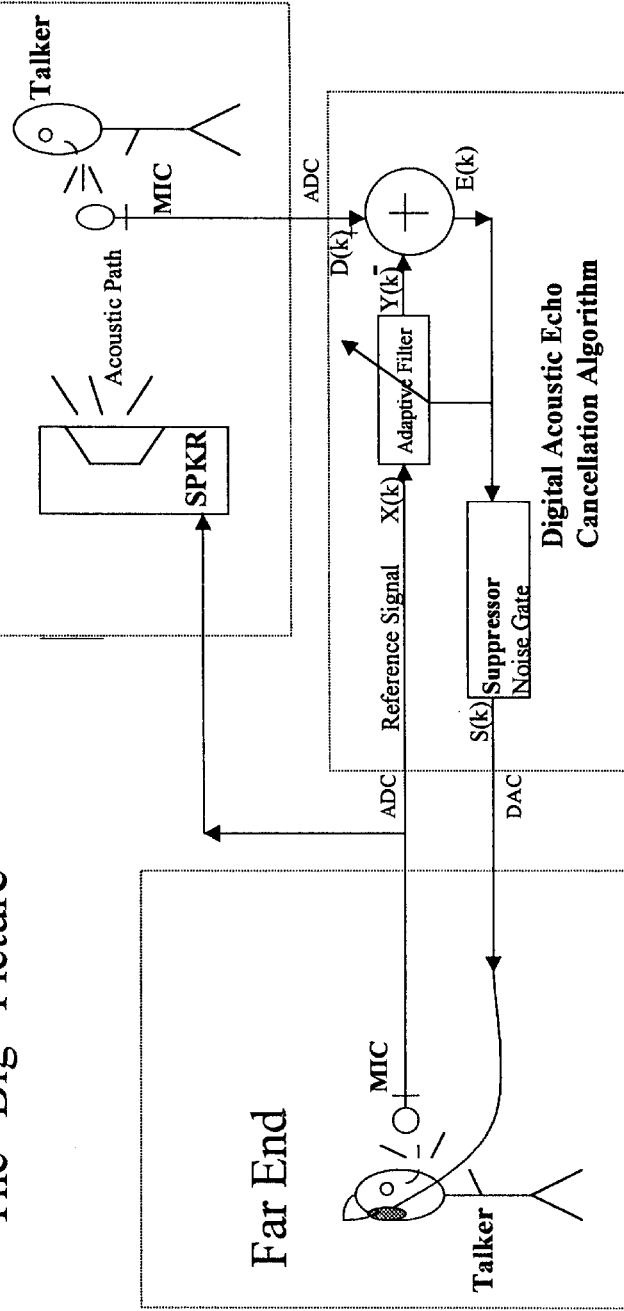

FIG. 1

Acoustic Echo Cancellation
The "Big" Picture

X(k): Contains information(speech) from the far end to be broadcast into the near end room. It is also considered the "reference" signal.
Y(k): Estimate of Echo. If the adaptive filter perfectly models the speaker to microphone acoustic path then Y(k)=D(k) when no noise (including near end talking) is present.
D(k): Signal containing information to be sent to the Far End. Far end speech present in D(k), due to the acoustic coupling between speaker and mic, will show up as echo at the far end.
E(k): Error signal. If the adaptive filter model matches the acoustic path then the far end signal present in D(k) is reduced in En.
S(k): Signal sent to the far end. S(k)=E(k) with attenuation strategically placed to suppress any residual far end signal(echo).

General Telephone system

Echo Source

"Far End" Hybrid generates echo of "Near end" speech and reflects it back to "Near end" as Echo Far End Echo Circuit Model With Analog Echo Removal at Source. If Balance Impedance equals Subscriber Loop Impedance then Echo is effectively removed

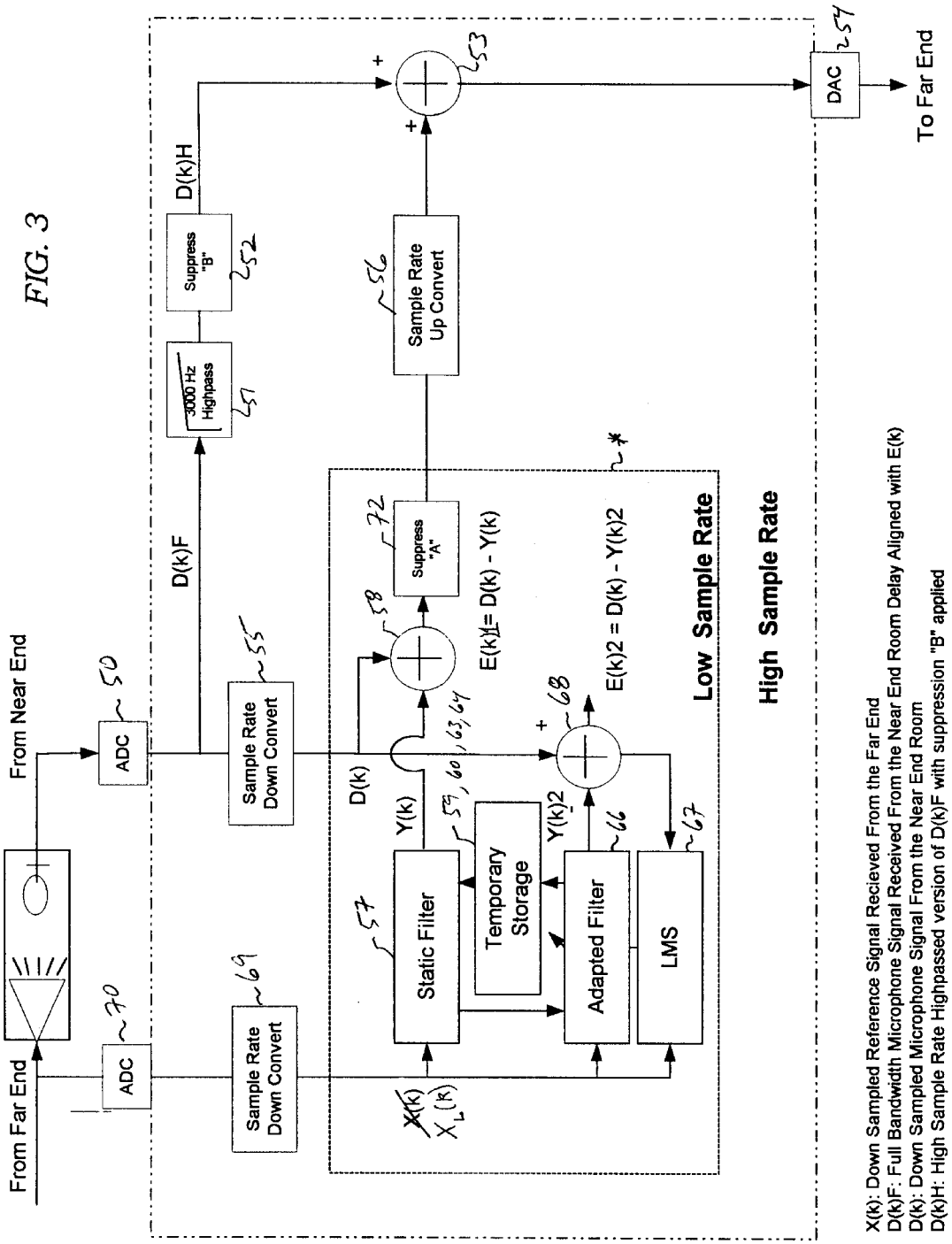

Diagram Outlining Method For Reducing Echo When Using a Fast Convergence Adaptive Algorithm Three steps in flow chart expanded

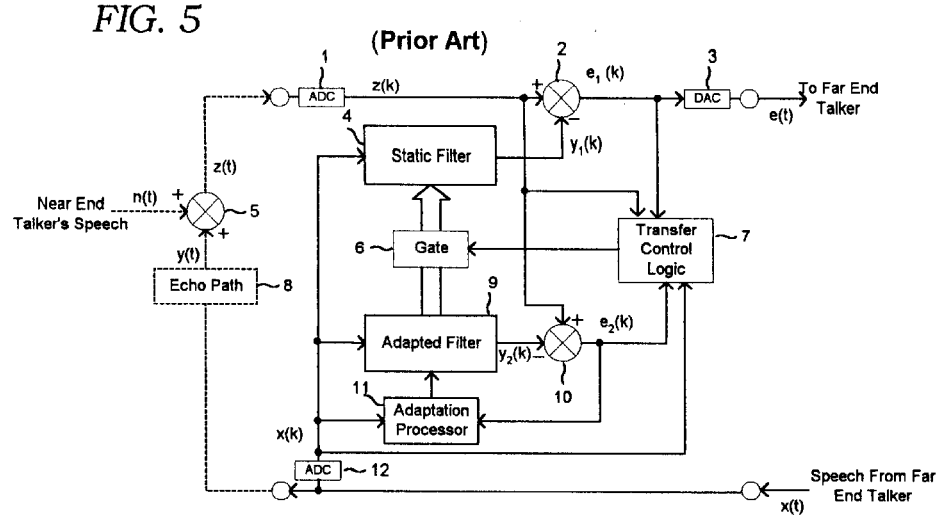
FIG. 5 (Prior Art)
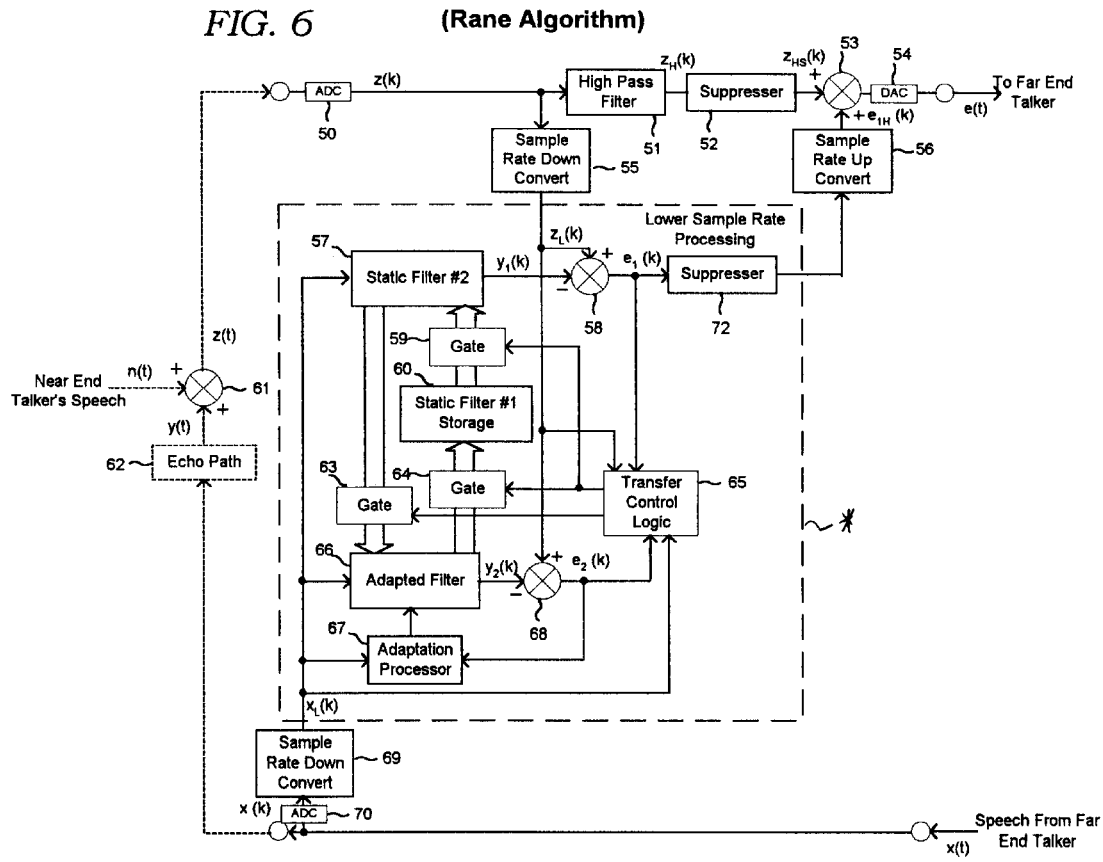
FIG. 6 (Rane Algorithm)

Rane Algorithm

The Numbers shown in BOLD print are Block IDs from FIG.5 and FIG.6

Transfer Control Logic
Block 65

ECHO CANCELLATION METHOD AND APPARATUS

TECHNICAL FIELD

The invention is generally related to methods and apparatus for canceling echo in acoustic and electronic systems such as public address systems and teleconferencing systems. More specifically, there are two general categories of echo cancellation that the invention relates to: methods for controlling line echo cancellation and acoustic echo cancellation.

BACKGROUND OF THE INVENTION

"Acoustic echo" arises from the acoustic properties of a room as in a teleconferencing system. Acoustic echo originating at a near end location will be heard by a far end observer. Acoustic echo originating at a far end will be heard at the near end. An example with acoustic echo originating at the near end, while the far end transducers are acoustically isolated is shown in FIG. 1. From that figure it can be seen that acoustic echo will be heard at the far end of a conferencing system when the far end talker's voice gets acoustically coupled with the near end talker's microphone at the near end room. This coupling is almost always unavoidable. However, the strength of the coupling is affected by the designer's setup of the room and any acoustic treatment applied to the room. "Line echo" originates from the physical transmission of a signal between the near and far ends through the Public Switched Telephone system. From FIGS. 2a, 2b, and 2c it is apparent that the line echo source comes from the Telephone Company transmitting and receiving two signals over a single wire while not accurately matching an internal balance impedance. The type of transmission system that allows transmit and receive signals to affect each other in this manner is referred to as a "two-wire" system. If the transmit and receive signals are isolated from each other it is called a "four-wire" system. The line echo is said to arise at the interface point of a "two-wire" and "four-wire" system. It is possible for a signal to go through multiple two-wire to four-wire interfaces on its trek between near and far ends.

A main factor affecting the severity of both types of echo is the amount of time before the talker hears his own voice back as an echo. The longer the delay the more perceptible the echo. For line echo the delay will increase as the phone company digitally processes a signal or as it is physically routed over longer distances. For acoustic echo both the acoustic path delay and transmission delay contribute to the delay of the echo.

Both types of echo problems (line and acoustic) are conventionally addressed using an echo cancellation system in generally the same way. However, the specific differences in the sources of echo require differences in their solutions.

In both types of echo cancellers an adaptive filter is typically used to create a model of the echo path. The model is formed by sending a reference signal through an estimated model of the echo path at the same time it is sent though the actual echo path and forming an error between them. This error is used to adapt the filter until the model becomes accurate (the error is minimized). When the model becomes accurate the echo is also minimized. Obviously the echo estimate has to be rather accurate to have a significant effect. If the model is poor the echo can actually be enhanced instead of attenuated.

The adaptive model can be formed off line when no one is talking by sending a random noise sequence through the path being modeled as well as through the adaptive filter. A gradient search can be performed on the received signal to minimize the mean squared error difference between the actual and modeled paths. When the path changes significantly this "training" process can be repeated. This process is time consuming and very annoying to those located at the near end. An acoustic path changes more often than an electrical path so this "off line" training method is used for line echo cancellers a little more often than acoustic ones.

A conventional method of forming the adaptive model is to use the actual speech signal being transmitted to the near end location as the training signal. This is much more desirable in an echo cancellation system because of its non-intrusive nature. However, great care must be taken so that the on-line training is done only when noise (which includes near end speech) is minimal. Any excessive noise will cause divergence in the filter model being formed from the actual echo path, reducing the effectiveness of the echo cancellor. The primary cause of noise at the near end is speech originating at the near end. Most echo cancellers employ a "double-talk" detector to determine if it is safe to adapt the filter model or not. Examples of "double talk" detectors are described in U.S. Pat. Nos. 5,535,194, entitled "Method and Apparatus for Echo Cancelling with Double Talk Immunity", issued Jul. 9, 1996; and 5,295,136, entitled "Method of Performing Convergence in a Least Mean Square Adaptive Filter Echo Canceller", issued Mar. 15, 1994; both assigned to Motorola, Inc., the disclosures of which are incorporated herein by this reference.

The number of filter weights (also called taps or filter coefficients) is directly related to the amount of delay that can be modeled by the adaptive filter. The amount of delay that can be handled by the adaptive filter is referred to as the echo canceller's "tail length". An acoustic echo canceller is located at the acoustic source of echo so that it will not have to model the transmission delay. The source of line echo is electrical in nature and usually requires a smaller tail length than an acoustic echo canceller. Line echo cancellers usually require a tail length on the order of 30 ms. An acoustic echo canceller requires a tail length anywhere from four to eight times the length of the line echo canceller (120 to 240 ms).

Complete echo removal in an actual system is unachievable so echo suppressors are placed after the adaptive filter to remove any remaining echo. Suppressors work by strategically attenuating a signal being sent to the far end when far end speech is present. Echo suppression is a non-linear process.

The adaptive filter is only capable of modeling a linear system. If suppressors or other non-linearities are in the path being modeled then poor performance will result.

Sub-Band Echo Cancellers

Sometimes the adaptive filter model is broken up into multiple frequency bands using a separate adaptive filter for each band. This sub-band approach is obviously more complex but has two potential benefits, and a drawback.

A sub-band echo canceller speeds up the training process when speech is used. Speech utterances have limited frequency content. If speech is being used to form the adaptive model then the adaptive filter will seek to minimize the error of the dominant frequency components used in the training signal. This results in the "learning time" for the adaptive filter being increased when training is done with speech as opposed to training with random noise. A sub-band echo canceller uses multiple adaptive filters, each operating on a limited band of frequencies. This requires each filter to only be accurate over a limited frequency range, reducing the training time.

A second benefit is that once the processing cycles have been spent for splitting the frequency into sub-bands each band may be processed at a lower sample rate. The lower sample rate makes it possible to increase the number of filter weights processed allowing an increase in the canceller's tail length.

The main drawback to the sub-band approach is an increase in the canceller's signal throughput time. The delay through a standard echo canceller is primarily due to anti-aliasing and reconstruction filters on the converters (about 3 ms to 7 ms). A sub-band system has the delay of the analysis and synthesis sections required to split the signal into sub-bands and sample rate convert each signal (about 30 ms to 40 ms). This is a noticeable time lag that enhances undesirable echo in systems with an otherwise low delay.

Adaptive Filtering

Adaptive filtering may be done in either the time or frequency domains. There are many adaptive weight update techniques in use today. Due to its minimal computational requirements, the most common adaptive filter weight update algorithm is the time domain Least Mean Square, or LMS, adaptive update algorithm. If the training signal used has a large dynamic range (such as speech) then a Normalized Least Mean Square (NLMS) algorithm is frequently used.

A comprehensive discussion of the NLMS algorithm may be found in *Adaptive Filter Theory*, 3rd Ed., by Simon Haykin, Prentice Hall, 1996 (pgs 432–439). A summary of the algorithm appears on page 437 of that reference.

Coefficient Leakage over time, the adaptive filter coefficients may slowly drift away from their adapted solution. To ensure long term stability for an adaptive filter, "coefficient leakage" is often used. In essence, a small percentage of the filter coefficient values are reduced or leaked out over time. A discussion of coefficient leakage may be found in *Adaptive Filter Theory*, 3rd Ed., by Simon Haykin, Prentice Hall, 1996 (pgs 746 747).

Divergence

When an echo canceller tries to adapt in the presence of far end speech (double-talk) or other sporadic or impulsive noise the weights of the adaptive filter diverge from their solution resulting in an increase of echo and noise artifacts. Most echo cancellers rely on the use of a double-talk detector to determine if it is "safe" to adapt the filter weights, and halt adaptation during double-talk to minimize a filter's divergence. Once it becomes sufficiently safe the filter re-adapts, removing any divergence that took place during the time it took to detect the initial double-talk. Such an approach prohibits the use of higher adaptation gains due to the delay in detecting the double-talk. While smaller adaptation gains keeps divergence at a minimum until double-talk can be detected, it also slows the adaptation process, leaving periods of increased echo, when the echo path modeled by the adaptive filter changes. This solution requires the added complexity of a double-talk detector implementation.

There is at least one other major train of thought in the literature on minimizing divergence due to double-talk or other impulsive noise. This method relies on the adaptive filter to decorrelate the input signal Xn from the error signal En, a process that happens normally during filter adaptation. A cross-correlation between Xn and En is formed (a digital signal process). This cross-correlation is monitored and used as a metric in determining if the adaptive filter has sufficiently converged. When the filter is converged there is little correlation between Xn and En. There is much stronger correlation when the adaptive filter is a poor match for the echo path. Once the filter has converged, adaptation is stopped, thus removing the possibility of divergence because it is no longer adapting. When the echo path changes it is reflected in the cross-correlation metric, and adaptation is resumed. This method ignores the presence of double-talk during adaptation and seeks to minimize divergence by adapting only when necessary. If the acoustic path changes often (the case for many acoustic echo applications), or if frequent speech, sporadic or impulsive noise is present (the case when a classroom is the target application) this method provides little benefit. This method also carries an added complexity equivalent to that of the main filter convolution.

A description of double-talk detectors and the use of a cross-correlation metric described above are given in the paper "New Double-Talk Detector", *IEEE Transactions on Communications*, Vol. 39, No. 11, November 1991. See also U.S. Pat. No. 5,206,854, entitled "Detecting Loss of Echo Cancellation", issued Apr. 27, 1993 and assigned to AT&T, which uses a newer method.

There is one other significant method for avoiding the problem of divergence due to adapting the filter in the presence of noise. The method is outlined in the figure labeled as prior art (FIG. #5). A description is disclosed by Ochiai et al. "Echo Canceller with Two Path Models", *IEEE Transactions On Communications*, Vol. COM-25, No. 6, June 1977, pp. 589–595. FIG. 5 shows a diagram illustrating the manner in which a digital echo canceller is generally used as part of a teleconferencing system. Ochiai et al. used an adaptive background filter running in parallel with a foreground filter. Each filter produces an estimate of the echo. When the adapted background filter provides an estimate that proves better than the foreground filter, its filter coefficients are copied to the foreground filter location. The echo-attenuated signal is taken from the foreground filter so that divergence due to noise is not heard.

There are a couple of drawbacks to the method they proposed. First, when the background filter's coefficients diverged due to the presence of noise, they would either need to adapt out the diverged signal or be reset to zero and start over in the adaptation process, producing a time delay before improvements could be made to the foreground filter. The other significant problem comes when making decisions to copy the background filter coefficients to the foreground filter. If the adaptation process uses a high gain/fast convergence algorithm, the coefficients will diverge quickly in the presence of noise, causing errors in determining when it is valid to update the foreground set. If a diverged set of coefficients is placed into the foreground filter, system performance is severely degraded.

Computational Burden

To help put the computational burden issue into perspective a discussion of the computational requirements is in order. The computational load (# of required clock cycles) for a Finite Impulse Response (FIR) filter and a LMS update on a Digital Signal Processor (DSP) such as the Motorola 56362 is on the order of 3*N where N is the number of taps of the FIR filter. As stated previously a key feature of an echo canceller is its tail length. The tail length is the amount of time that can be represented by the FIR filter being used to model the microphone to speaker acoustic path where the echo arises. The longer the tail length the larger the acoustic delay that the filter can represent and the larger the room that the echo canceller can handle. The amount of time that can be represented by the FIR filter (Tail Length) is a function of both N and the sample rate that the FIR filter is being processed at. The following equation illustrates this:

Tail Length in seconds=$N*T=N$/Sample Rate (Hz).

Where: N is the # of filter taps and T is the period of the sample rate in seconds For example at an 8 kHz sample rate a 2000 tap FIR filter would have a Tail Length of 250 ms. This 2000 tap filter would use 3*N clock cycles.

In the world of real-time processing the constrained resource is time represented by the number of instruction cycles available for signal processing. The Number of instruction cycles M, that are available on a processor such as the 56362 are as follows:

M (instruction cycles available for processing)=Processor Clock Speed/Sample Rate of processing In a DSP system in order to increase bandwidth the sample rate must be increased(see Nyquist Rate in DSP sampling theory). From the instruction cycle equation an increase in sample rate results in a linear decrease in instruction cycles that are available for processing. The Tail Length equation shows that a direct increase in sample rate (by some factor L) results in a decrease in Tail Length by a factor of L, so when the sample rate is increased by a factor of L the Tail Length of the echo canceller must decrease by a factor of L squared in order to perform the needed processing (for a fixed processor clock speed). Another way of viewing this is that in order to increase the Sample Rate by a factor of L and still maintain the same Tail Length the processor clock speed would need to increase by a factor of L squared.

To increase Bandwidth from 3 kHz (telephone quality) to 20 kHz (professional audio quality) would require an increase in Sample Rate by a factor of 6. For the example above the 250 ms tail length would shrink to about 7 ms for the same number of processing clock cycles.

SUMMARY OF THE INVENTION

It is an object of the invention to provide two complementary apparatus and methods: an adaptive echo canceller which improves filter convergence by removing divergences; and a means for increasing the audio bandwidth of the echo canceller without a large increase in computational burden.

These two objects of the invention are complementary and synergetic when used together as described below. The invention achieves the above objects and advantages, which will be apparent from the description below, by providing a method and apparatus for reducing far end echo in a high gain, fast converging far end echo cancellation system having a far end echo path. At its broadest concept, the invention provides a method and apparatus for introducing a signal having far end echo from an echo path to an echo canceling system. The method and apparatus then establishes a set of original filter coefficients and generates a primary echo correcting signal based on the original filter coefficients. A more recent set of filter coefficients is then temporarily stored, along with a set of substantially real time filter coefficients which are used to generate a real time echo correcting signal. The primary echo correcting signal and the real time echo correcting signal are compared over a preselected time interval. The original filter coefficients are replaced with the recent filter coefficients, and the recent filter coefficients are replaced with the real time filter coefficients only if the error signals are converging. In this manner, a system employing the method and apparatus of the invention substantially ignores temporally transient and large amplitude near end noise in the echo path. In addition, the real time set of filter coefficients can be replaced with the original coefficients if the error signals are diverging during the preselected time period. In this manner, a system employing the methods substantially ignores near end noise.

An Adaptive Echo Canceller which Improves Filter Convergence by Removing Divergence The preferred embodiment of the first inventive method improves convergence in the presence of impulsive or sporadic noise (including speech) originating at the near end by minimizing divergence. This removes the need for an accurate double-talk detector or a cross-correlation metric discussed above.

The power of the filter model error (echo) is compared regularly to see which filter is returning the least error. In the invention, the check to see if the filter being adapted has diverged (and thus should be overwritten by the static filter's coefficients) is accomplished by comparing the amount of time that the power of E(k)2 (see FIG. 3) is greater than the power of E(k)1 during 350 ms time intervals. If the power of E(k)2 is greater for more than 250 ms then it is overwritten by the other coefficients. The check to see if the filter being adapted is returning less error (and thus overwriting the static filter's coefficients) is accomplished by comparing the amount of time that the power of E(k)2 is less than the power of E(k)1 during 350 ms time intervals. If the power of E(k)2 is less for more than 250 ms then it overwrites the filter model being listened to.

One alternate embodiment of the invention includes the possibility that noise can occur during the last portion of the comparison previously described. That is, it is possible to have the adapted filter diverge quickly and still be considered a better model and overwrite the static coefficients. Thus for the adapted filter coefficients to be considered a better model than the static ones they must be consistently better for two of the 350 ms periods. After the first 350 ms period they are copied to memory, if after the second 350 ms the adapted coefficients are still better then a copy from memory to the static set occurs. This comparison process is shown in FIG. 4.

A Means for Increasing the Audio Bandwidth of the Echo Canceller without a Large Increase in Computational Burden The preferred embodiment second method increases the bandwidth of the signal sent back to the far end without a large increase in computational burden. It does this by only applying the echo cancellation to the lower end of the frequency spectrum where the majority of speech energy resides (below 3 k), and relies on suppression techniques (light computational burden) for frequencies above 3 kHz.

The invention utilizes echo cancellation where the energy in speech communication takes place below 3 kHz and utilizes suppression techniques for frequencies above 3 kHz. The end result is an echo cancellation system, which will return a bandwidth of 20 kHz to the far end with a computational complexity on the order of a 3 kHz bandwidth system.

This is accomplished by operating the echo cancellation at two different sample rates. The echo canceller operates at the lower sample rate while the higher sample rate portion of the system, provides the extended frequency range. When speech is detected at the far end suppression is applied to the higher frequencies before being mixed with the error signal and sent back to the far end.

While the majority of speech energy resides below 3 kHz (transmission bandwidth of telephone company) there is some (although less) speech energy in the 3–20 kHz band. The invention provides differing amounts of suppression for the different frequency bands.

BRIEF DESCRIPTION OF THE DRAWINGS

FIG. 1 is a high level schematic illustrating acoustic echo problems arising in a conventional teleconferencing system having a near end room and a far end room.

FIG. 3 is a high level block diagram schematic representation of an adaptive echo canceller for improving filter convergence including a means for increasing the audio bandwidth of an echo canceller without a large increase in computational burden cooperatively employed in the invention.

FIG. 5 is a schematic representation in block diagram form of a conventional prior art signal processing system.

FIG. 6 is a schematic representation in block diagram form illustrating the inventive algorithm based echo canceller of the present invention.

DETAILED DESCRIPTION OF THE PREFERRED EMBODIMENTS

Figure 2A:
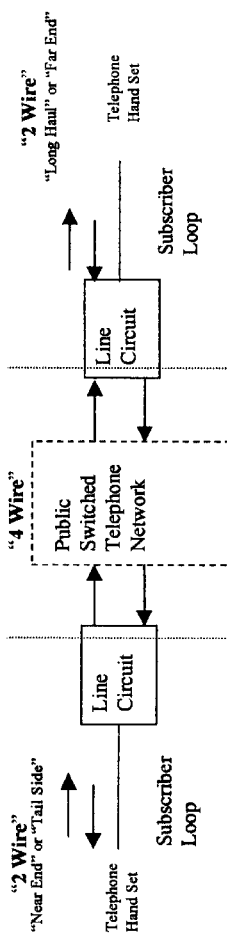
FIGS. 2a, 2b, and 2c illustrate line echo problems arising from the physical transmission of a signal between the near and far ends through the public switched telephone system.
Figure 2B:
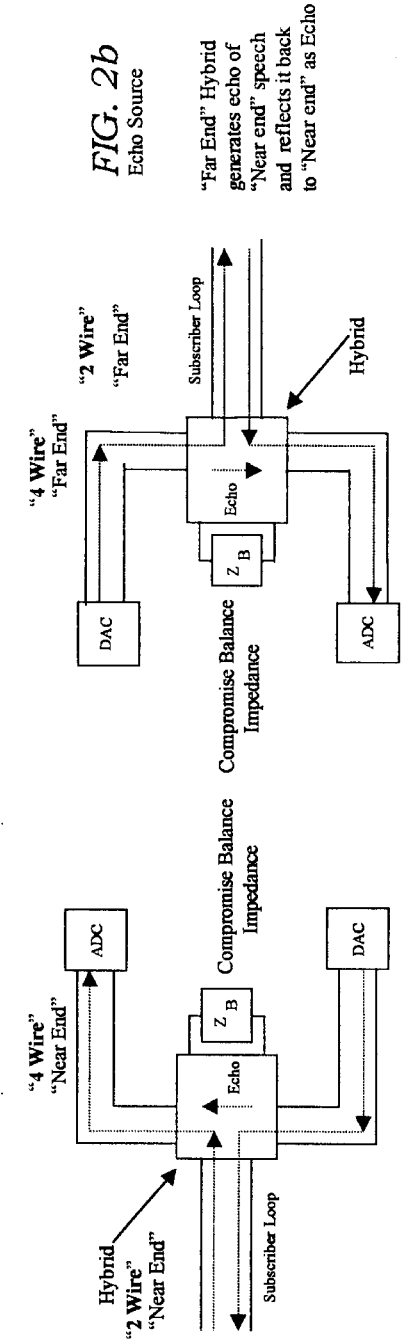
Figure 2C:
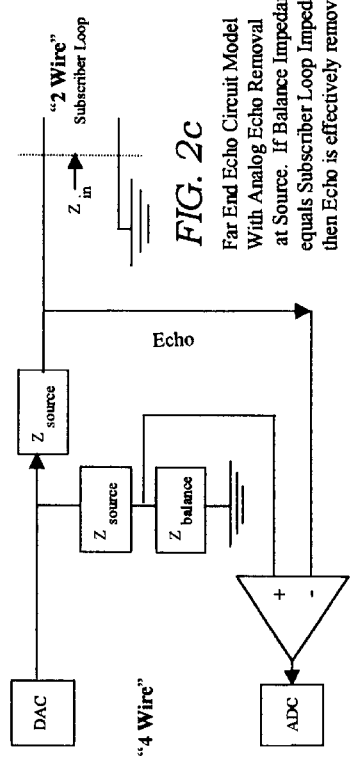
Figure 4:
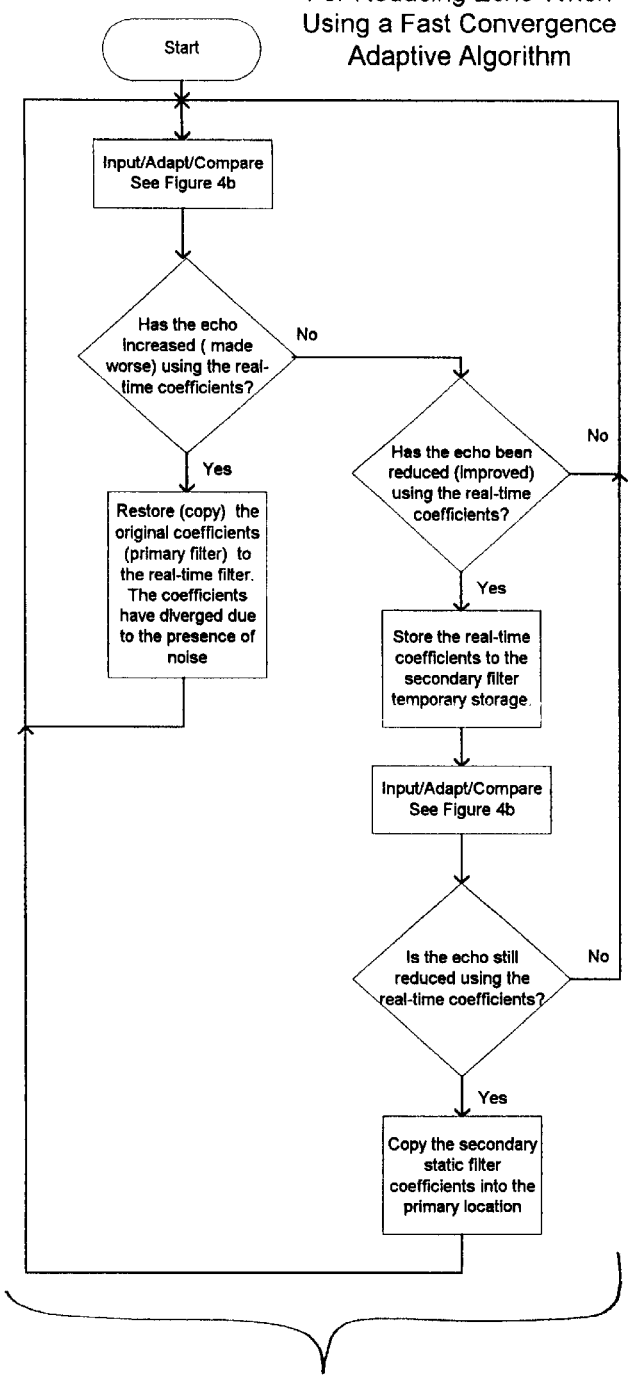
FIGS. 4 and 4b is a logic flow diagram illustrating the embodiment of the invention shown in FIG. 3 in which adapted filter coefficients are a better model than static filter coefficients for copying to adapted filters of the invention.
Figure 4B:
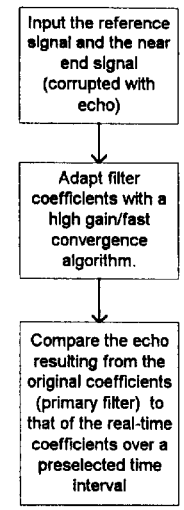

FIG. 6 shows the inventive algorithm based echo canceller. Continuous signals are shown as a function of time (t) in the figure. When a signal is converted to discrete time (becomes a digital signal) through the analog to digital conversion process it is shown as a function of (k). Physically this process is done using off the shelf analog to digital converters (ADC). Once in digital form the actual echo cancellation algorithm is performed on a Digital Signal Processing integrated circuit (another off the shelf device). The final step of the process is to convert the discrete time signal back to a continuous time version of the same using a digital to analog converter (DAC).

Description of Generic Commonly Used Signal Processing Blocks Found in FIGS. 5 and 6.

ADC and DAC (block numbers 1,3,12,50,54,70)

These are commonly performed functions (done with off the shelf hardware) that convert a continuous time signal to a discretely sampled one (ADC) or a discretely sampled signal to a continuous one (DAC).

Digital Filter Blocks representing the echo path 8&62 (block numbers 4,9,57,66)

Digital Filtering is perhaps the most fundamental process used in Digital Signal Processing. In generic digital filtering an input signal is convolved with an impulse response (filter coefficients) to produce an output signal. These filters do exactly that and are unique only in the fact that their coefficients are intended to match the impulse response of the echo path 8&62. The adaptation processor (blocks 11 & 67) is used to adjust the filter's coefficients so that they match the echo paths impulse response. If the impulse response of Static filter 4 matches that of the echo path 8 then the error signal e(t) is free of all echo. The following is an equation for a digital FIR (finite impulse response) filter convolution where L is the number of filter coefficients (represented as W) in the filter and i represents a particular iteration in time:

$$y(i) = \sum_{k=0}^{L-1} Wk * x(i-k)$$

Static filter storage block 60 is simply a storage location for filter coefficients. No convolution is performed on these coefficients.

The Gate blocks (numbers 6, 59, 63, 64) are intended to represent the conditional transfer of filter coefficients between one filter block and another. The oversized arrow going into or out of these blocks simply represents the direction in which the transfer occurs. The single lines feeding the gate blocks originating from the Transfer Control Logic blocks 7&65 control when the transfers occur. As an example when the Transfer Control Logic 7 flags Gate 6 that it is time to open, the Gate copies the filter coefficients of 9 to the filter coefficients of 4.

The addition and subtraction nodes (numbers 2,10,53,58, 68) perform simple addition or subtraction functions. The sign at each of the two inputs to each node indicate the operation. For example node 2 implements the following equation $e_1(k)=z(k)-y_1(k)$ and node 53 implements $e(t)=e_{1H}(k)+Z_{HS}(k)$.

The adaptation processor blocks (numbers 11, 67) use the two input signals feeding it to adjust the coefficients of their associated adapted filter blocks 9&66. Various adaptation algorithms are well known in the field of signal processing and any number of them could be used here. One example of an adaptive algorithm is the, Least Mean Square (LMS) algorithm. It is a stochastic-gradient algorithm that minimizes the mean-square error of a signal. The Normalized Least Mean Square (NLMS) is another very common algorithm that is a slight variant of the LMS algorithm. The LMS algorithm filter update equation has the following form:

$$W_L+1=W_L+\mu e X_L$$

Where W is the filter coefficient vector and X is the input signal vector and e is the instantaneous error at nodes 10 or 68 in FIGS. 5 and 6, $\mu$ is the adaptation gain (0<$\mu$<1).

The sample rate conversion blocks 55, 56 & 69 perform another very common signal processing function called sample rate conversion. They are used in the inventive algorithm to create extra time for the echo cancellation algorithm to function. The sample-rate down converters decimate a digital signal from a higher sample rate to a lower one. This means that the algorithm will need to process fewer digital samples than it would have to do otherwise. Part of the sample-rate down conversion process is to low pass filter the signal so artifacts of the decimation process do not color the low frequency portion of the signal. The sample-rate up conversion process interpolates a signal sampled at a lower sample-rate to one sampled at a higher rate. Block 56 performs this function in the Inventive algorithm so that the summation at node 53 can occur on two signals that have the same sample-rate.

The high pass filter block 51 is another common digital filtering technique. The coefficients of this filter do not represent the impulse response of the echo path they are calculated so as to separate the High frequencies of the input signal for processing aimed solely at those frequencies.

The suppression block 52 is a function commonly found in telecommunications. It selectively applies attenuation to a signal to gain a desired effect. The Inventive algorithm attenuates the signal when speech is detected from the far end talker. This suppression removes unwanted echo from the high passed version of the signal. Suppression is a non-linear process that operates according to the following equations:

when speech from the far end is present (suppressor on) $Z_{HS}(K) = \alpha * Z_H(k)$ where $0 < \alpha < 1$ when speech from the far end is absent (suppressor off) $Z_{HS}(K) = Z_H(k)$ Description of Blocks in FIGS. #5 and #6 that are not Commonly Used The Echo path blocks 8 and 62 represent the acoustic coupling between speakers and microphones at a near end location. They are not part of the echo cancellation algorithm.

Nodes 5 and 61 are not part of the echo cancellation algorithms as they reside outside of the digital processing. They are included to illustrate the fact that the signal Z(k) is made up both of the far end talkers speech as well as speech and noise originating in the near end room.

The Transfer Control Logic blocks 7 and 65 determine when the Gate blocks that they are attached to transfer filter coefficients between their filter blocks. The prior art implementation of Block 7 is disclosed by Ochiai et al. in the paper previously described and entitled "Echo Canceller with Two Path Models". The Inventive implementation is described thoroughly by flow Chart #2 of FIG. 8.

Figure 7:
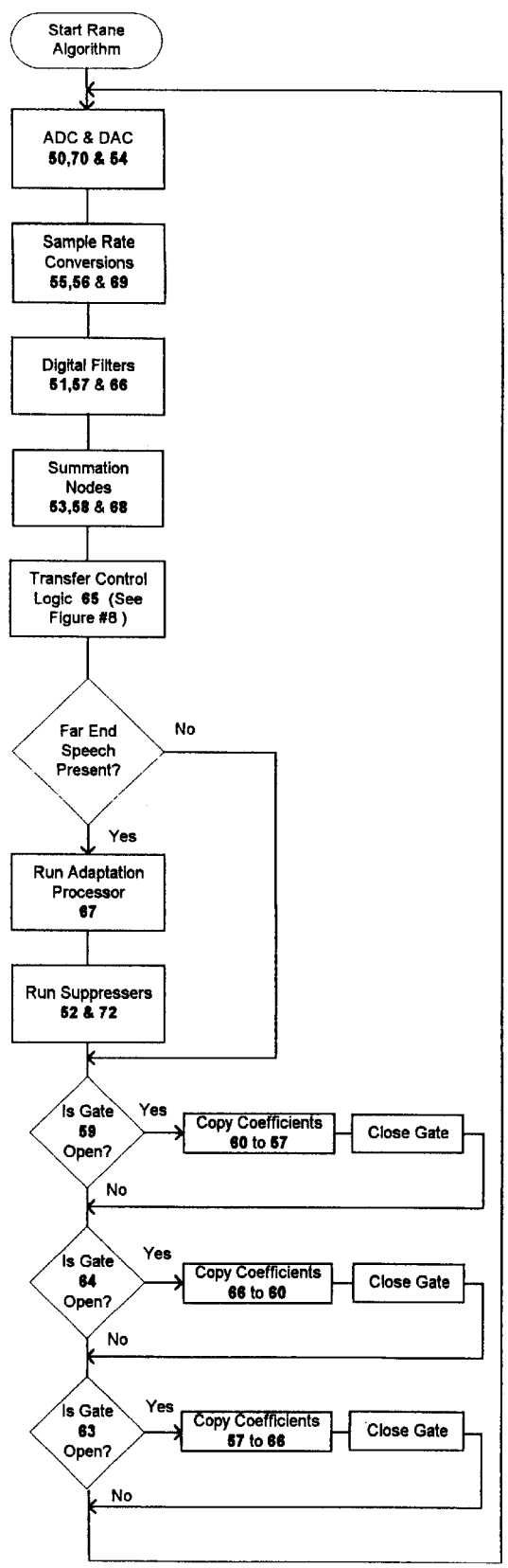
FIG. 7 is a logic flow chart outlining the method steps achieved by the invention shown in FIG. 6.

Description of Flow Chart #1 of FIG. 7 (Inventive Algorithm)

Most of the operational blocks listed have Block reference numbers shown in bold print. They represent the functional blocks from FIG. 5 and FIG. 6. A description for these blocks exists in the description of the figures. Each pass through the flow chart represents an iteration for a given digital sample. The first block represents the process of discretely sampling the inputs as well as converting the last digital output to an analog signal. These blocks handle the Input/Output portions of the echo canceller.

After gathering input data the signals are sample-rate converted, filtered and the appropriate additions and subtractions then occur. The next function to perform is the Transfer Control Logic (See flow chart 2, FIG. 8).

If far end speech is present then the filter coefficients are adjusted to more closely to match the impulse response of the echo path by the adaptation processor 67. After the adaptation processor, suppression is applied on the high frequency portion of the signal. The high frequency portion does not have echo cancellation applied to it. If no "far end" speech is present then filter coefficient update and suppression do not occur.

The conditional gate processing that is shown for each of the three gates listed simply copies filter coefficients from one filter block to another. A gate is opened in the transfer control logic block and is closed after the coefficients are copied to their destination location.

Figure 8:
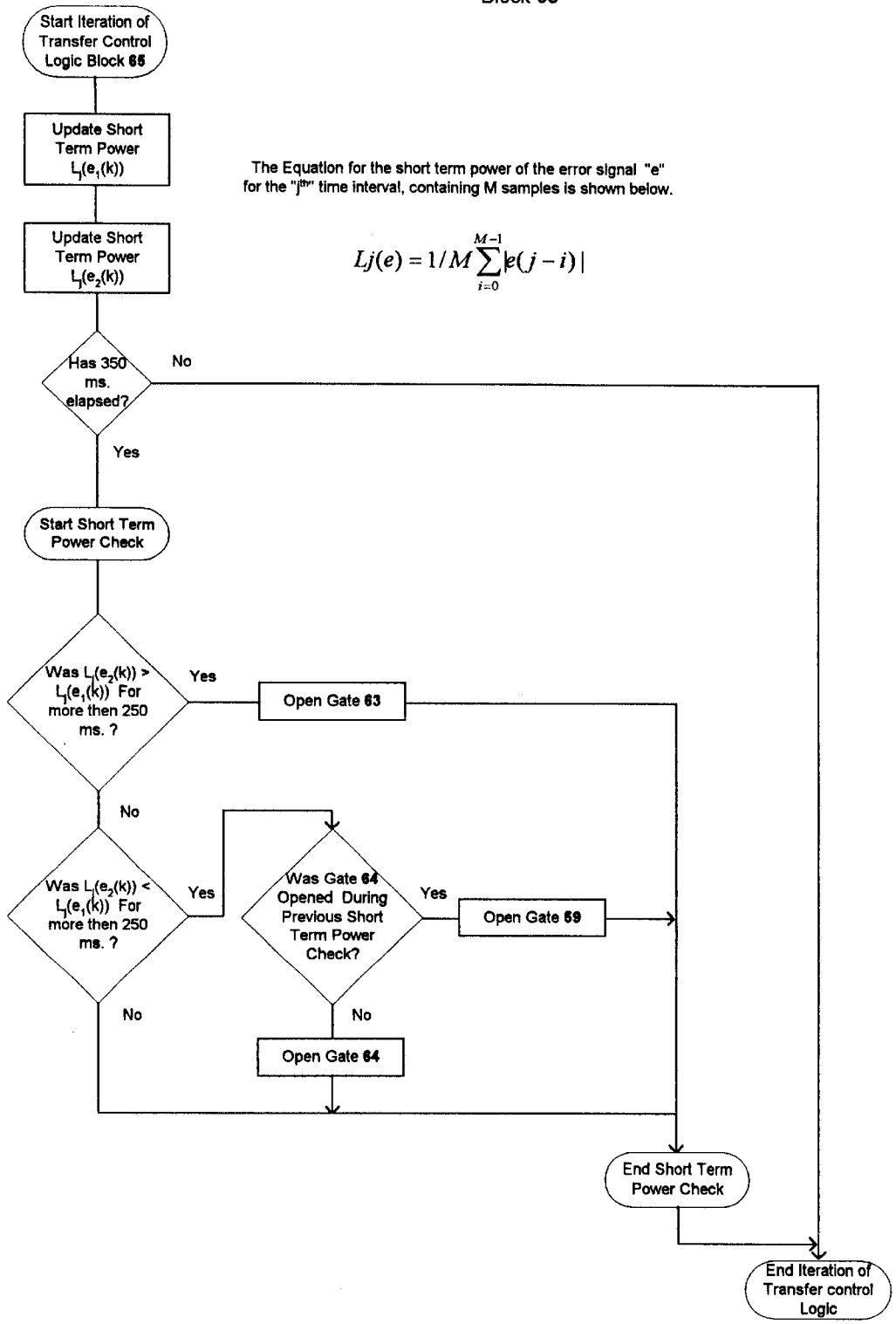
FIG. 8 is a flow chart showing the method steps employed in the transfer control logic of the invention outlining the processing in a single iteration of the transfer control logic.

Description of Flow Chart #2 of FIG. 8 (Transfer Control Logic)

Flow chart #2, FIG. 8 outlines the processing in a single iteration of the transfer control logic. The only outcome of the transfer control logic is to open a particular gate. The first operations performed are to calculate the short-term power of the error signals. The signals used in the power calculations are the outputs of nodes 58 and 68. An equation describing how to calculate the short-term power is shown on the flow chart.

Every 350 ms a check is made to determine if any of the gates should be opened. The checks are based on the percentage of time that one short term power was greater than the other. If one was greater than the other for more than 250 out of the 350 ms then the action shown is taken.

Specific Advantages of the Inventive Algorithm when Compared to the Prior Art

The addition of Gate block 63 improves the overall convergence of the algorithm. It does so by quickly eliminating filter coefficient divergence (which occurs due to noise or double talk) by replacing the diverged coefficients with a known good set. If this gate is not present then the adaptation processor has to remove the divergence adaptively which is a slow process.

The revised Transfer Control Logic 65 provides the means for a more accurate and more frequent update of the static filter #2 57 than exists in the prior art. The transfer control logic disclosed by Ochiai et al is too restrictive and only allows the occasional update of the static filter (shown as 4 in the prior art). Furthermore the level of performance used as a metric in determining improved filter convergence may never be achieved with some echo paths. Instead of using a specific attenuation level in dB as a metric the Inventive algorithm uses the amount of time that the adapted filter error e2(k) is better or worse than the Static filter error e1(k). This metric is much more generic and allows the algorithm to have application to a variety of echo paths.

The addition of Static Filter #1 Storage 60 and Gate block 59 creates a delayed transfer of filter coefficients. This delayed transfer allows the adaptation gain to be more aggressive than exists in the prior art. The need for this delayed transfer stems from the latency that exists in calculating the short-term power in order to detect divergence. The short-term power calculation equation shown on flow chart #2 (FIG. 8) is performed over the last M samples. If divergence occurs during the most recent portion of the M samples which are a part of the calculation, they will not contribute much to the power calculation because they are being averaged over M samples. If they are transferred directly to block 57 the echo canceller will store a diverged set of coefficients. A smaller adaptation gain would also solve this problem by allowing the coefficients to only slowly diverge. Of course this also significantly slows the convergence of the system. The delayed transfer allows for a fast convergence and still catches the divergence.

Blocks 51,52,53,55,56 and 69 create a high frequency section that does not have echo cancellation present. Providing echo cancellation at higher frequencies is computationally inefficient. This echo cancellation system uses echo cancellation at the lower frequencies (where more speech energy resides) and suppression on the higher frequencies providing a more computationally coefficient Hybrid system.

Potential Algorithm Applications

Since the conversion algorithm improves convergence by removing the divergence of adaptive filters being modeled in the presence of non-constant noise, it has broad application. It could be used for line or acoustic echo cancellation, each of which may incorporate a sub-band or standard filter architecture.

The algorithm is independent of the adaptive update used to adapt the filter. It doesn't matter whether LMS, NLMS or a Recursive Least Squares update method is used. Since the algorithm only monitors the power output of the filter it is also independent of the filter implementation used, it will work with either FIR or Infinite Impulse Response (IIR) filter structures. Other applications of the described methods can be implemented by those of ordinary skill in the relevant art. Thus, the invention is not to be limited by the above description but is to be determined in scope by the claims which follow.

I claim:

1. A high gain, fast convergence far end echo cancellation system for reducing far end echo in an echo path, comprising:

an adaptation processor for generating substantially real time filter coefficients;

a primary static filter for storing an original set of filter coefficients and for generating a primary echo correcting signal;

a secondary static filter for temporarily storing a recent set of adaptation constants;

a high gain adapted filter for storing a real time set of filter coefficients and generating a real time echo correcting signal;

first comparison means for generating a first error signal indicative of a degree of echo cancellation resulting from summation of the primary echo correcting signal and a far end echo containing signal;

second comparison means for generating a second error signal indicative of a degree of echo cancellation resulting from summation of the real time echo correcting signal and the far end echo signal; and, transfer control logic means, cooperatively interconnected with the primary static, secondary static and adapted filters, and with the first and second comparison means, for comparing the error signals over a preselected time interval and for replacing the original filter coefficients with the recent filter coefficients and the recent filter coefficients with the real time filter coefficients only if the error signals are converging, whereby the system substantially ignores temporally transient and large amplitude near end noise in the echo path.

2. The echo cancellation system of claim 1, wherein the preselected time interval is between approximately 75 milliseconds and approximately one second.

3. The echo cancellation system of claim 2, wherein the preselected time interval is approximately 250 milliseconds.

4. The echo cancellation system of claim 1, wherein the transfer control logic means replaces the real time set of filter coefficients with the original filter coefficients if the error signals are diverging during the preselected time period, whereby the system substantially ignores near end noise.

5. The echo cancellation system of claim 4, wherein the preselected time interval is between approximately 75 milliseconds and approximately one second.

6. The echo cancellation system of claim 5, wherein the preselected time interval is approximately 250 milliseconds.

7. The echo cancellation system of claim 1, wherein the system has a low pass filter for blocking substantially high frequency signals from being applied to the primary static and adapted filters, and to the first and second comparison means so that echo cancellation is not performed on the substantially high frequency signals.

8. The echo cancellation system of claim 7, wherein the low pass filter has a cut off frequency of approximate 3 KHz.

9. The echo cancellation system of claim 7, wherein the transfer control logic means is a digital device, and wherein the system has an analog to digital converter operatively connected to the echo path for digitizing the far end echo containing signal prior to being applied to the primary static and adapted filters, and to the first and second comparison means, and wherein the low pass filter is a sample down rate converter, whereby computational burden on the adaptation processor is substantially reduced.

10. The echo cancellation system of claim 1, wherein the system has an analog to digital converter operatively connected to the echo path for digitizing the far end echo containing signal prior to being applied to the primary static and adapted filters, and to the first and second comparison means, wherein the primary static, secondary static and adapted filters, and the first and second comparison means and the transfer control logic means are all digital devices, and wherein the system has a digital low pass filter in the form of a sample down rate converter, whereby computational burden on the adaptation processor is substantially reduced.

11. The echo cancellation system of claim 10, wherein the transfer control logic means replaces the real time set of filter coefficients with the original filter coefficients if the error signals are diverging during the preselected time period, whereby the system substantially ignores near end noise.

12. A method for reducing far end echo in an echo path in a high gain, fast convergence far end echo cancellation system, comprising the steps of:

introducing a signal having far end echo from an echo path to an echo canceling system;

generating and storing an original set of filter coefficients;

generating a primary echo correcting signal based on the original set of filter coefficients;

temporarily storing a more recent set of filter coefficients;

generating substantially real time filter coefficients related to the far end echo in the signal;

storing the real time set of filter coefficients and generating a real time echo correcting signal based on the real time set of filter coefficients;

generating a first error signal indicative of a degree of echo cancellation by applying the set of original filter coefficients to the far end echo containing signal and summing a resultant primary echo correcting signal and the far end echo containing signal;

generating a second error signal indicative of a degree of echo cancellation by applying the set of substantially real time-filter coefficients to the far end echo containing signal and summing a resultant real time echo correcting signal and the far end echo signal; and, comparing the error signals over a preselected time interval and replacing the original filter coefficients with the recent filter coefficients and the recent filter coefficients with the real time filter coefficients only if the error signals are converging, whereby the system employing the method substantially ignores temporally transient and large amplitude near end noise in the echo path.

13. The method of claim 12, wherein the preselected time interval is between approximately 75 milliseconds and approximately one second.

14. The method of claim 13, wherein the preselected time interval is approximately 250 milliseconds.

15. The method of claim 12, wherein the real time set of filter coefficients is replaced with the primary filter coefficients only if the error signals are diverging during the preselected time period, whereby the system employing the method substantially ignores near end noise.

16. The method of claim 12, including the step of filtering out substantially high frequency signals prior to generating the error correcting signals so that echo cancellation is not performed on the substantially high frequency signals.

17. The method of claim 16, wherein frequencies above approximately 3 KHz are filtered out.

18. The method of claim 16 including the step of first digitizing the far end echo containing signal prior to generating the error signals and wherein the filtering step is achieved by sample down rate converting the echo containing signal to reduce computational.

19. A method for reducing far end echo in a high gain, fast convergence far end echo cancellation system having a far end echo path, comprising the steps of:

introducing a signal having far end echo from an echo path to an echo canceling system;

establishing a set of original filter coefficients and generating a primary echo correcting signal based on the original filter coefficients;

temporarily storing a set of recent filter coefficients;

storing a set of substantially real time filter coefficients and generating a real time echo correcting signal;

comparing the error signals over a preselected time interval and replacing the original filter coefficients with the recent filter coefficients and the recent filter coefficients with the real time filter coefficients only if the error signals are converging, whereby the system employing the method substantially ignores temporally transient and large amplitude near end noise in the echo path.

20. The method of claim 19, wherein the real time set of filter coefficients is replaced with the original filter coefficients only if the error signals are diverging during the preselected time period, whereby the system employing the method substantially ignores near end noise.

* * * * *